March 27, 1962 W. VESPER ETAL 3,026,675
DEVICE FOR THE AIR INTAKE INTO THE PRIMARY ZONE OF A
COMBUSTION CHAMBER IN A TURBO-MACHINE
Filed July 28, 1959 6 Sheets-Sheet 1

INVENTORS
WALTER VESPER,
REGINALD SCHWZINGER, AND
LOUIS JULES BAUGER
By:
Watson, Cole, Grindle & Watson
ATTORNEYS

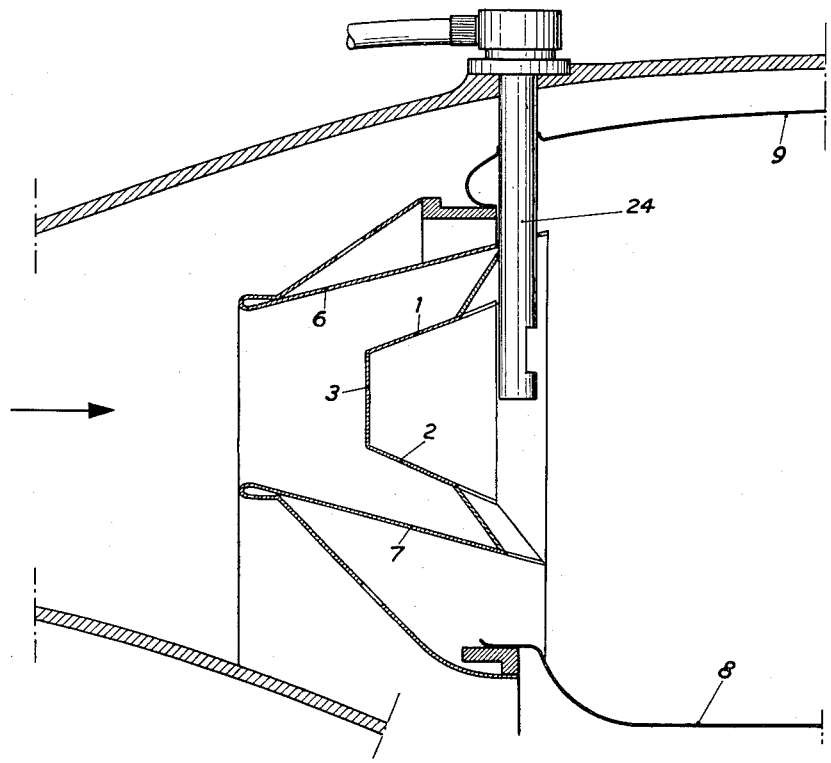
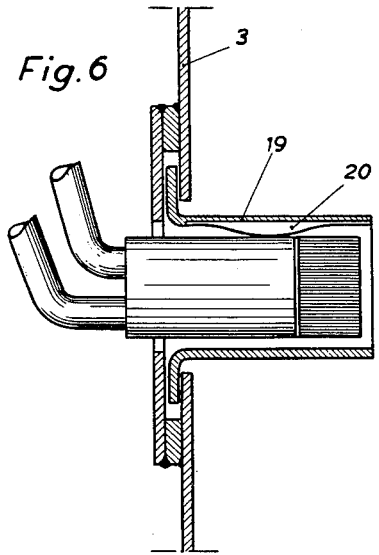
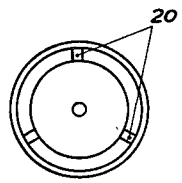

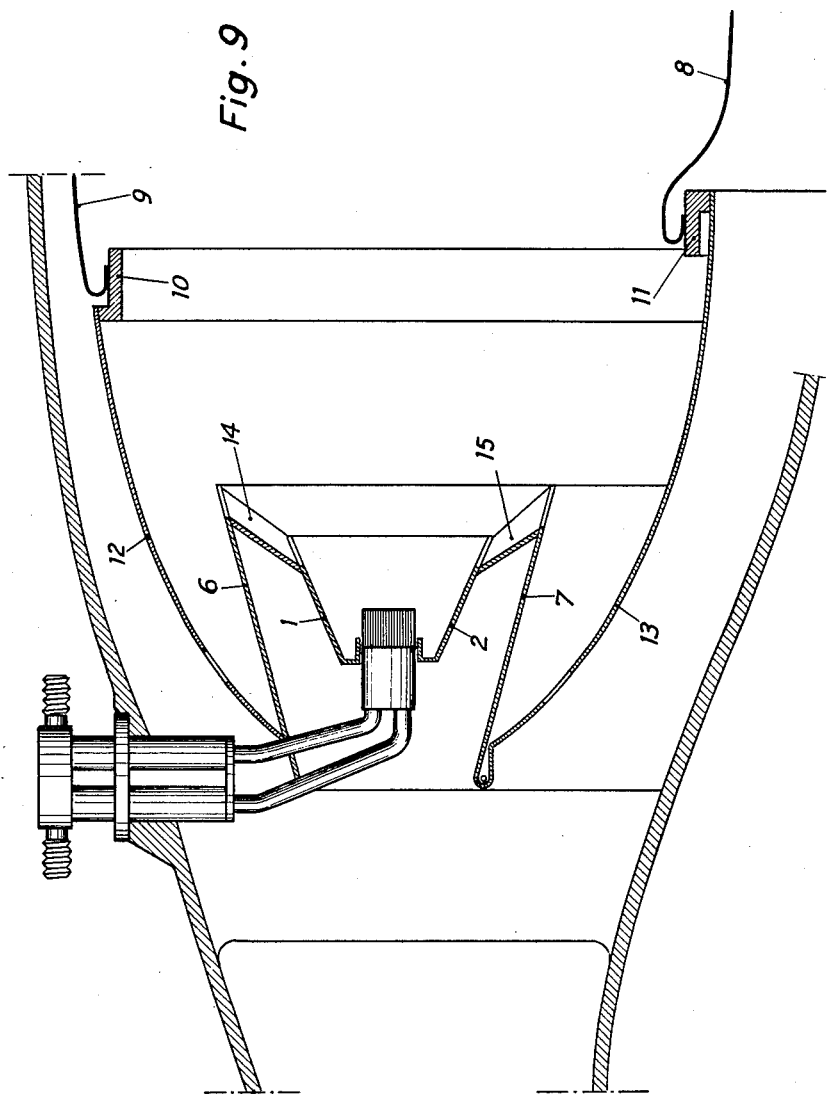

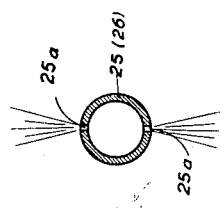
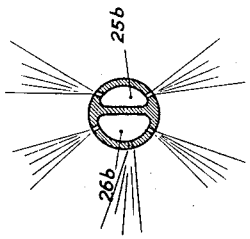
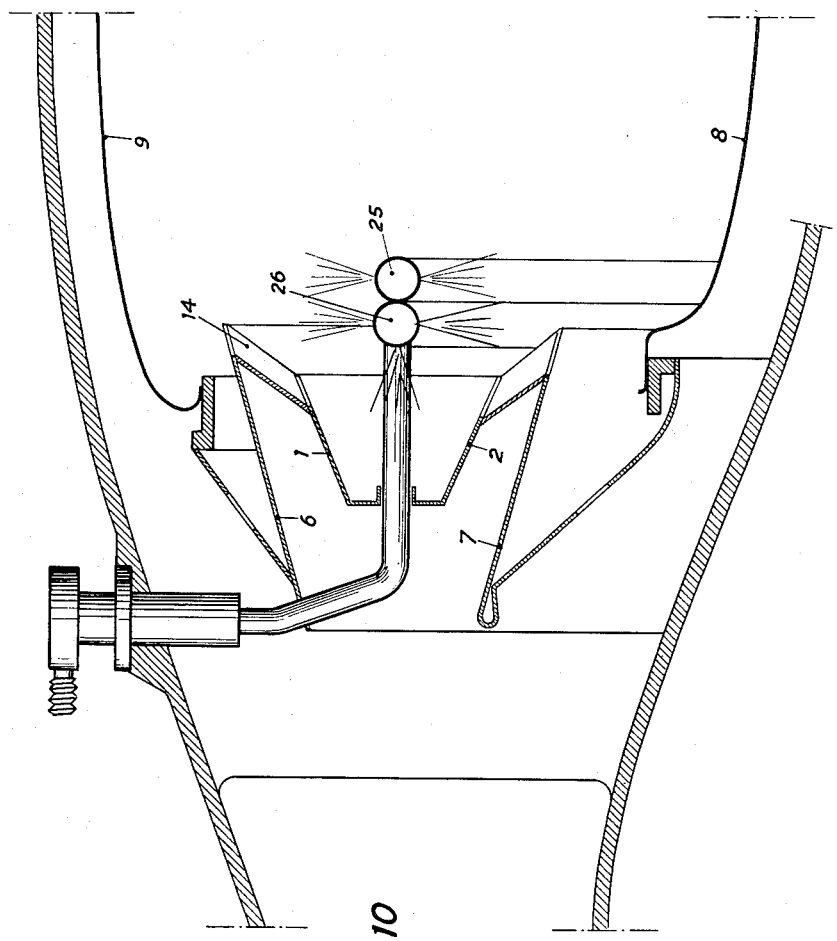

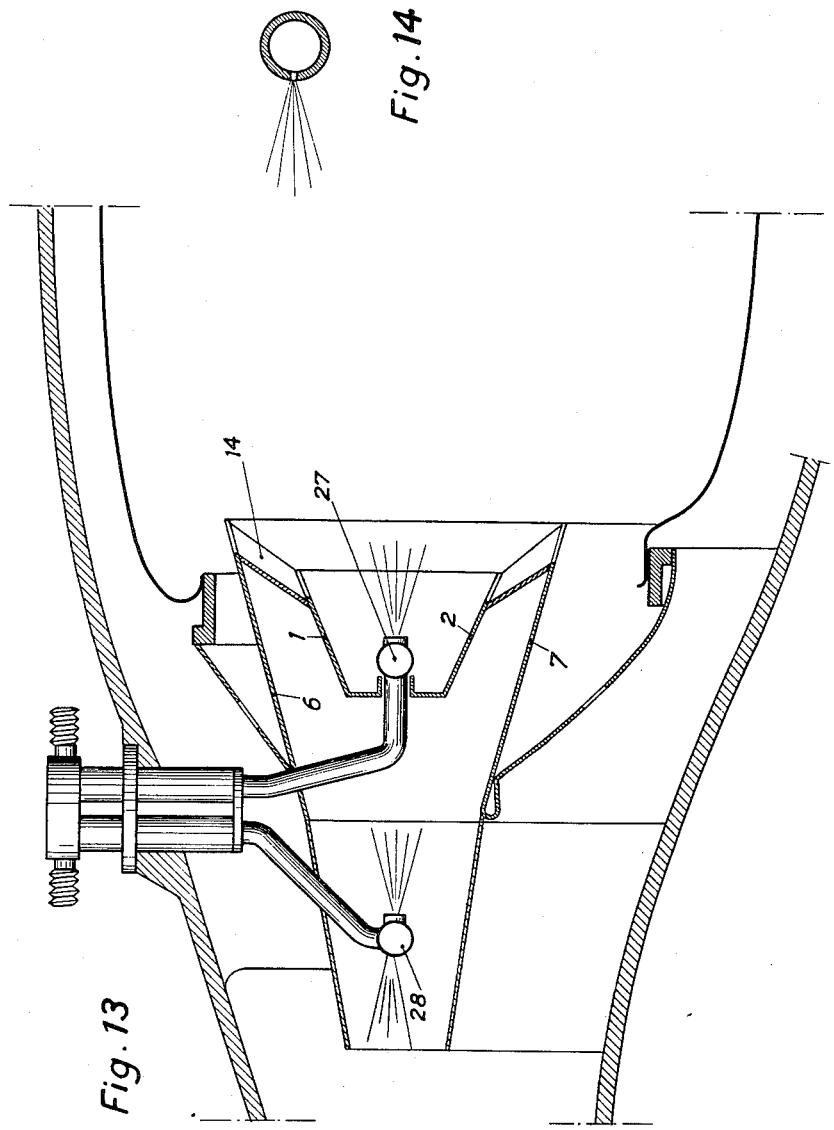

United States Patent Office 3,026,675
Patented Mar. 27, 1962

3,026,675
DEVICE FOR THE AIR INTAKE INTO THE PRIMARY ZONE OF A COMBUSTION CHAMBER IN A TURBO-MACHINE
Walter Vesper and Reginald Schinzinger, Dammarie-les-Lys, and Louis Jules Bauger, Vanves, France, assignors to Societe Nationale d'Etude et de Construction de Moteurs d'Aviation, Paris, France, a French company
Filed July 28, 1959, Ser. No. 830,005
Claims priority, application France Aug. 22, 1958
14 Claims. (Cl. 60—39.74)

The present invention relates to a burner device for a combustion chamber of annular shape, that is to say having the form of a body of revolution about an axis which can coincide with the axis of the turbo-machine, for example with the axis of the compressor and turbine in the case of a turbo-jet engine.

The burner according to the invention comprises a central flame-holding means in the form of a ring bounded by two frusto-conical or similarly shaped surfaces which are coaxial with the combustion chamber and are appropriately assembled together, the fuel injectors being distributed about the axis of the annular combustion chamber and opening into the interval between these two surfaces, and also a diffuser formed of two likewise frusto-conical or similar surfaces arranged on either side of the central flame-holding means and forming a duct serving to convey the primary air into the combustion chamber, the said surfaces of the diffuser being connected to those of the central flame-attaching means by suitably shaped ribs which on the one hand ensure the desired rate of flow and distribution of air and on the other hand serve for the formation of turbulent zones promoting combustion.

This burner makes it possible to obtain, in an annular combustion chamber, a distribution of physical phenomena which is identical in all the meridian cross-sections of the chamber and uniform circumferential temperature distribution, which is a considerable advantage more particularly as regards the behaviour of turbine blades and the unresponsiveness of the temperature distribution to irregularities in the flow of incident air, such as can result from the drag produced for example by the arms of the casing.

In order to facilitate obtaining good performances at all loads, it is possible to provide different flame-attaching stages which are utilised or not according to the combustion volume necessary for the particular air-fuel ratio in question. A peripheral flame-holding means can be provided, for example, about the diffuser in the annular gap separating the protruding end of this diffuser from the wall of the annular combustion chamber.

The following description with reference to the accompanying drawings, which are given by way of non-limitative example, will make the various features of the invention and the manner of carrying them into effect readily understood, any feature brought out either from the text or from the figures being understood to come within the scope of the present invention.

FIG. 1a is a view on a small scale showing a complete axial sectional view of the inlet of the combustion chamber.

FIG. 3 is a cross-sectional view of a rib according to one example of embodiment.

FIGS. 4 and 5 show two possible methods of supplying the burner with fuel.

FIGS. 6 and 7 show the device ensuring the concentricity of the injection heads in the burner orifices.

FIG. 8 shows an ignition device.

FIG. 9 shows a modified form of arranging the mixers, avoiding accidental intakes of secondary air into the primary zone.

FIGS. 11, 12 and 14 are sectional views of injection jet pipes comprising simple holes (directed radially in most cases) which can be used concurrently with conventional atomisers.

FIGS. 10 and 13 show two modified forms of dual feed through two juxtaposed (FIG. 10) or separate (FIG. 13) jet pipes.

Figure 1:
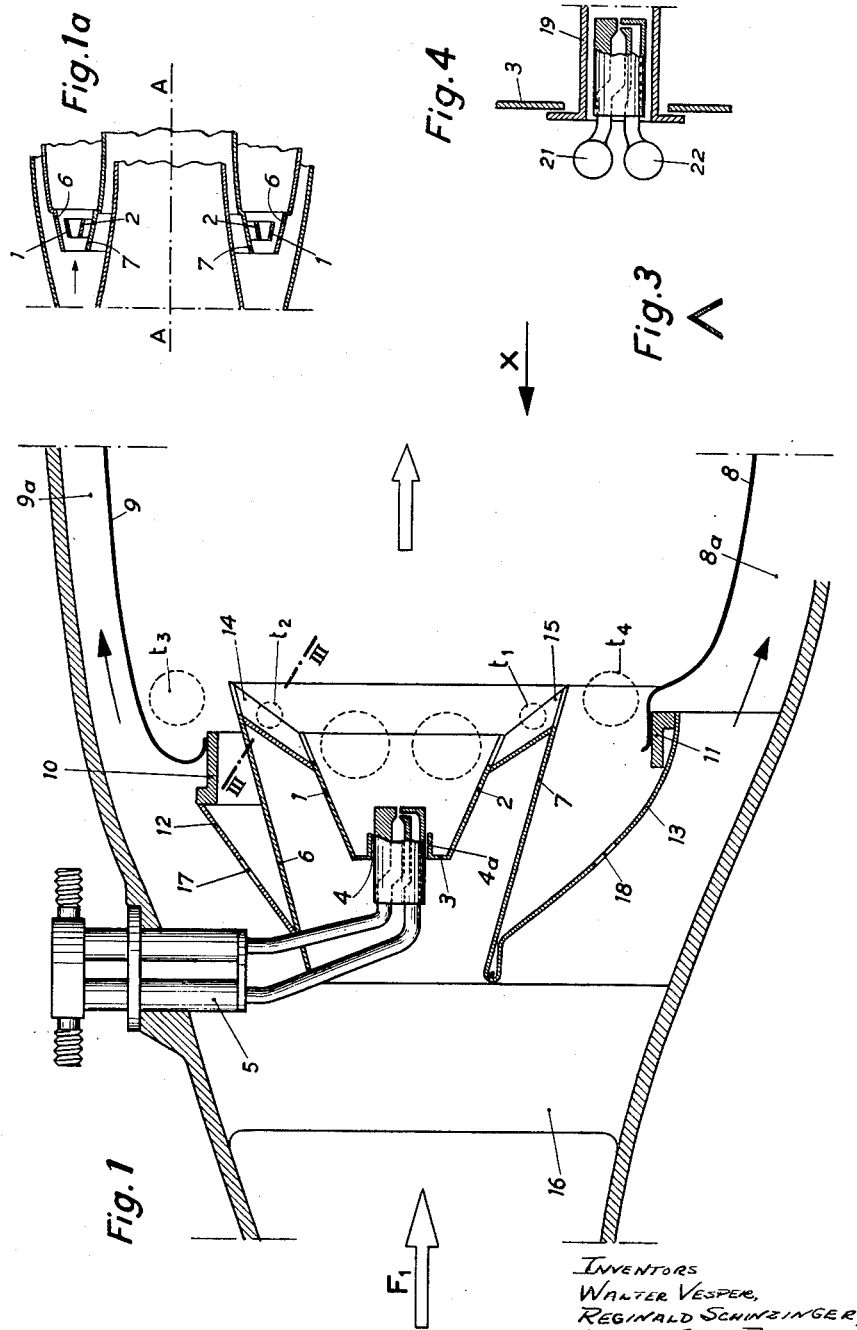
FIG. 1 is a side view of one form of embodiment of the improved burner, partly in section on a plane containing the axis of the combustion chamber.

The burner which receives the air coming from the compressor in the direction of the arrow $F_1$ is composed (see FIGS. 1, 1a and 2):

(1) of a central flame-holding means in the form of a ring bounded by two frusto-conical sleeves 1 and 2 which are connected at the upstream end, with respect to the air flow, to a flat ring 3. This latter piece is provided with holes 4 on the same drilling diameter which are equidistant from one another, so as to permit the passage of the fuel feed injector heads such as 5.

(2) of a diffuser formed of two likewise frusto-conical sleeves 6 and 7 used for guiding the primary air and containing the above-described flame-holding means.

(3) bearing means for the inner and outer mixers 8 and 9 of the combustion chamber, comprising rings 10 and 11 machined to an appropriate diameter and configuration and held fixed by sleeves or straps 12 and 13, which themselves are connected to the outer walls of the preceding diffuser.

(4) ribs 14 and 15 of appropriate shape (V-shaped cross-sections, for example, as shown in FIG. 3) the purpose of which is firstly to render the central flame-holding means and the diffuser fast with one another and then, by their judicious spacing, to ensure the desired flow and distribution or primary air for combustion.

The assembly is held in the inlet casing of the chamber by profiled arms 16 fast with the walls or by any other appropriate means. The walls 1, 2, 6 and 7 are grooved between the ribs thus facilitating the passage of the flame.

The parts 1, 2, 3, 6, 7, 8, 9, 10, 11, 12 and 13 are in the form of rings of revolution about the axis A—A of the turbo-machine (see FIG. 1a).

Fuel can be fed in a single flow or in several flows: two in most cases. In the case of dual flow, these can be injected at the same part of the chamber or, on the contrary, in two different regions. Whatever the means employed, injection can be effected either in the direction of flow or in counter-current thereto.

The feed means will be separate injectors or distributing pipes comprising atomisers or even ordinary radial holes.

Some arrangements of the fuel distribution will be described by way of example.

Figure 2:
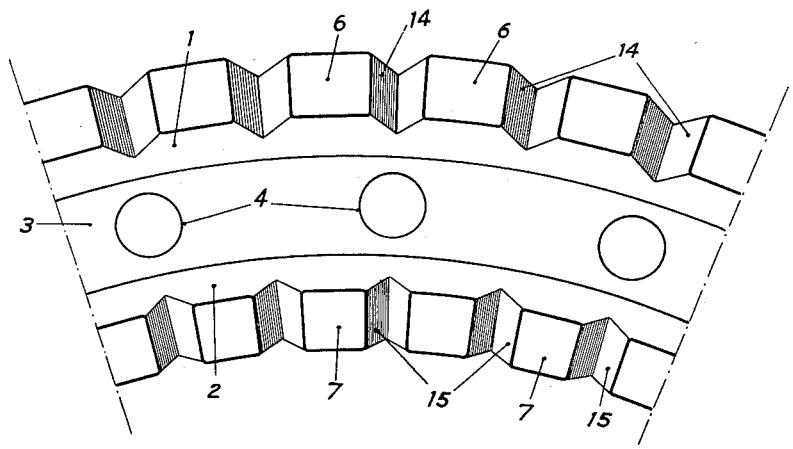
FIG. 2 shows a sector of the burner viewed in the direction of the arrow X. In order to make the figure clearer to read, the accompanying devices (injectors, mixing chambers and mixer support) have not been shown.

FIG. 1 shows a dual-flow injector 5 (basic and main flows). Several injectors of this kind are distributed about the axis A—A of the turbo-machine. The heads of these injectors pass through holes 4 in the wall 3 and permit injection sheltered from the flow of incident air. These holes can be provided with rings or sleeves 4a which have an appropriate quantity-regulating effect on the air passing through the small annular gaps between the heads of the injectors and the periphery of the holes 4. For appropriate air regulation, the diameters of the injector heads and the sleeves must be very slightly different from one another. On the other hand the heads and the sleeves must be strictly concentric if a uniform jet of fuel is to be achieved and if advantageous temperature distribution at the outlet is to be obtained. The inevitable non-circular surface parts and other manufacturing irregularities which may occur make it advantageous to use for each injector a sleeve 19 which can slide transversely with slight friction on the injector (see FIGS. 6 and 7). This sleeve 19 is provided with three or four keys 20 which, without opposing the passage of the air, ensure the correct positioning of the sleeve on the injector head.

A first variant of this method of injection is shown in FIG. 4. The existence of the annular plate 3 makes it possible to provide before this plate, without modifying the passage of the air, circular distributing pipes for feeding-in fuel. The basic flow and the main flow can thus be brought into the injection heads by two separate distributing pipes 21 and 22 (FIG. 4).

Now that the burner has been described it will be easy to follow the application of the principle of the various flame-holding means used in accordance with the different loads of the chamber. For small fuel flows (basic flow only) the small-volume flame is established at the end of the central flame-attaching means supplied by the small quantity of air passing through the holes 4 and sleeves 19 about the injector heads and having a low speed due to expansion. The spaces between the heads can, if appropriate, be provided with small holes for the passage of air which ensure a more regular flame. There will therefore be great flame stability and a very low extinction limit.

The air flow remaining unchanged, when the fuel flow increases the flame is established behind the ribs 14 and 15, through passage being promoted by the grooves in the surfaces 1 and 2 level with the ribs. Some of the air passing between the ribs through the annular ducts between the surfaces 1 and 6, 2 and 7 is then used for combustion in the return and turbulence zone $t_1$, $t_2$ which is produced downstream of each rib.

As the fuel flow continues to increase, the flame tends to fill not only the space between the ribs 14 and 15 but also the zones of the inner and outer mixers 8 and 9 by the grooves in the sleeves 6 and 7 in the region of the ribs; a return and turbulence zone is then created at $t_3$, $t_4$. Air passage holes such as 17 and 18 of appropriate diameter and appropriately distributed on the sleeves 12 and 13 permit the flame to be supported without blowing it out. In this way a very broad flame front is established which is favourable to flame shortening and high efficiency within the combustion chamber.

The secondary air passes into the annular ducts 8a and 9a to penetrate into the annular combustion chamber formed by the mixers 8 and 9, towards the downstream portion of the said chamber.

A burner of this kind, composed almost entirely of sleeves, is particularly simple to manufacture. Being itself a ring, it does not comprise any special burner support. It therefore fixes directly in the casing of the machine, which constitutes a considerable simplification.

For the same reason, the weight of this burner is reduced appreciably relatively to prior known constructions.

Ignition is effected rapidly at high speed and without a special starting injector by means of a sparking plug 24 situated appropriately in the central body between two injector heads which operate when the engine is running (FIG. 8).

Once the burner is ignited, the propagation of the flame in the central channel is instantaneous.

FIG. 9 shows a modified form of connecting the mixers 8, 9 according to which the bearing rings 10 and 11 of FIG. 1 are situated more downstream of the chamber. Tests have shown that this arrangement makes it more unlikely for secondary air to be introduced accidentally during operation, due to a local accidental clearance between the mixers and the rings. Moreover if despite everything some air intake occurs it will be less harmful at this place than immediately behind the burner. The front portion of the chamber thus forms a compact unit which permits only the introduction of the primary air flow controlled by the orifices provided intentionally for this purpose. The quality of combustion and the good characteristics of the chamber are thus preserved.

FIG. 10 shows a modified form of the feed device comprising two juxtaposed distributing pipes 25 and 26. The pipe 25 is entrusted with the atomisation of the basic flow and the other pipe 26 deals with the main flow. These pipes can be perforated with radial holes forming jets of fuel which are directed for example perpendicularly to the air flow. Such holes 25a are shown in FIG. 11.

Multiple-flow delivery can be effected by a single distributing pipe provided with two or more inner ducts such as 25b, 26b (FIG. 12). A pipe of this kind can be constituted, for example, of an extruded metal part.

Instead of being effected in the same region of the chamber, the dual-flow delivery of fuel (or the multiple-flow delivery) can be carried out at markedly different places through two (or more) distributing pipes comprising a large number of atomisers (FIG. 13). This method of injection has the advantage of bringing to the burner an already carburetted air, which makes it possible to shorten the chamber.

The distributing pipe 27, situated within the burner, has the task of injecting the basic flow into the effective return zone of the burner, whereas the pipe 28 situated upstream is given the task of injecting the main flow of fuel. Fuel may be injected in the direction of the flow or in counter-current, by providing in that latter case, an intake diffusor placed before the burners.

Stand tests have shown that the presence of a large number of atomisers promotes the combustion stability, and also promotes uniformity of chamber outlet temperatures.

Figure 5:
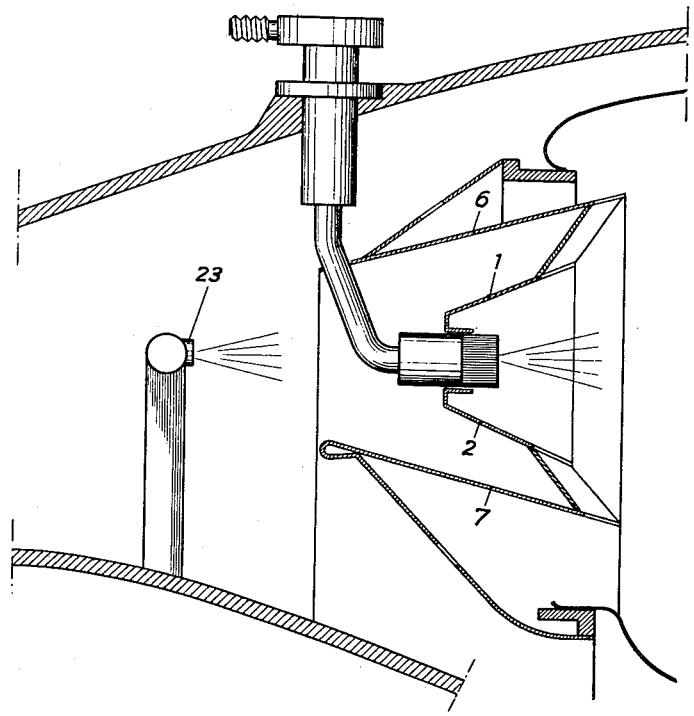

The two flows can also be delivered either by a double row of single-flow injectors or by a distributing pipe 23 upstream of the burner and a row of likewise single-flow injectors (FIG. 5 for example).

Excellent results have also been obtained by providing only the distributing pipe 27 (FIG. 13) for injecting the entire fuel delivery; in fact, if they are carefully dimensioned, the atomisers of such a pipe can ensure excellent atomisation at low pressure (especially when the turbojet engine is idling and in flight at high altitude). Of course this single delivery can also be effected by separate injectors (such as those of FIG. 5).

The atomisation holes can be formed in the distributing pipe or pipes in such a manner as to direct the fuel jets in counter-current with respect to the air flow (FIG. 14).

What is claimed is:

1. Burner for annular combustion chamber through which an air current travels, comprising a central flame-holding means in the form of a ring bounded by two substantially frusto-conical surfaces which are coaxial with the combustion chamber, forming between them a gap and connected to one another, fuel injectors distributed about the axis of the annular combustion chamber and opening into the said gap between the said surfaces, means surrounding part of said injectors for calibrating the passage of primary combustion air through said gap, a diffuser formed of two substantially frusto-conical surfaces which are arranged inside and outside, respectively of the said central flame-holding means and forming therewith a substantially convergent duct serving to convey the primary air into the combustion chamber, and ribs connecting the said surfaces of the diffuser to the said surfaces of the flame-holding means and which, on the one hand, ensure the desired flow and distribution of the air and on the other hand serve for the formation of turbulent zones which promote combustion.

2. Burner according to claim 1, also comprising a peripheral flame-holding means about the diffuser.

3. Burner according to claim 1, comprising a flat ring for connecting together the two frusto-conical surfaces of the central flame-holding means, said gap for the passage of a small proportion of the primary combustion air being provided in said flat ring.

4. Burner according to claim 3 wherein said means surrounding part of said injectors comprise cylindrical sleeves arranged about the heads of the injectors and carried by the said flat ring, in such a manner as to obtain carefully calibrated annular gaps for the appropriate quantity regulation of the air.

5. Burner according to claim 4, wherein the cylindrical sleeves are movable with respect to the said flat plate which carries them, means being provided for centering the said cylindrical sleeves with respect to the head of the corresponding injectors.

6. Burner according to claim 1, wherein the injector heads are of the dual-flow type.

7. Burner according to claim 1, comprising a supplementary injection distributing pipe, the said injectors being of the single-flow type.

8. Burner according to claim 1, wherein the fuel injectors are constituted by at least one annular distributing pipe perforated with atomising holes.

9. Burner according to claim 8, comprising two further distributing pipes juxtaposed downstream of the said distributing pipe.

10. Burner according to claim 8, wherein the distributing pipe is perforated with radial holes.

11. Burner according to claim 8, wherein the distributing pipe is perforated with oblique holes.

12. Burner according to claim 8, wherein a number of said atomizing holes are positioned for injecting the fuel in counter-current to the air.

13. Burner according to claim 1, wherein the combustion chamber is bounded by main walls, comprising sleeves connected to the outer walls of the said diffuser, bearing rings carried by the said sleeves and fixed on the said main walls of the combustion chamber, the said bearing rings being provided on a larger diameter than the opening diameter of the said diffuser.

14. Burner according to claim 13, wherein the said bearing rings are arranged downstream of the plane containing the opening of the said diffuser.

References Cited in the file of this patent

UNITED STATES PATENTS 2,901,032    Brola _____ Aug. 25, 1959

FOREIGN PATENTS 969,610    France _____ May 24, 1950
663,485    Great Britain _____ Dec. 19, 1951
701,320    Great Britain _____ Dec. 23, 1953
780,493    Great Britain _____ Aug. 7, 1957